United States Patent [19]

Anders et al.

[11] Patent Number: 4,484,878

[45] Date of Patent: Nov. 27, 1984

[54] FILLING LEVEL MONITORING DEVICE

[75] Inventors: Dietmar Anders, Hanover; Jurgen Voigt, Wathlingen; Heinrich Kruse, Neustadt, all of Fed. Rep. of Germany

[73] Assignee: Hermann Berstorff Maschinenbau GmbH, Hanover, Fed. Rep. of Germany

[21] Appl. No.: 551,921

[22] Filed: Nov. 15, 1983

[30] Foreign Application Priority Data

Nov. 15, 1982 [DE] Fed. Rep. of Germany ....... 3242239

[51] Int. Cl.³ .............................................. B29F 3/03
[52] U.S. Cl. .................................. 425/135; 264/40.3; 264/102; 264/203; 264/DIG. 78; 366/75; 425/147; 425/169; 425/203; 425/DIG. 60
[58] Field of Search ............... 425/135, 145, 147, 149, 425/203, 151, 154, 169, DIG. 60; 264/40.1, 40.3, 40.5, 40.7, 101, 102, 203, DIG. 78; 159/2 E; 366/75

[56] References Cited

U.S. PATENT DOCUMENTS

| | | | |
|---|---|---|---|
| 3,842,151 | 10/1974 | Stoy et al. | 264/203 |
| 4,181,510 | 1/1980 | Sano et al. | 425/203 |
| 4,197,268 | 4/1980 | Anders | 264/102 |
| 4,214,859 | 7/1980 | Anders | 264/40.7 |
| 4,298,322 | 11/1981 | Anders et al. | 425/203 |
| 4,321,230 | 3/1982 | Hungerford | 264/203 |

FOREIGN PATENT DOCUMENTS

| | | | |
|---|---|---|---|
| 129200 | 1/1978 | German Democratic Rep. | 425/203 |
| 45-27910 | 9/1970 | Japan | 425/203 |

Primary Examiner—Jay H. Woo
Assistant Examiner—Tinker R. McBrayer
Attorney, Agent, or Firm—Schwartz, Jeffery, Schwaab, Mack, Blumenthal & Koch

[57] ABSTRACT

A device for monitoring the filling level of the degassing space in an extruder used for processing thermoplastic materials comprises a level detection orifice located in the degassing dome or jacket of the extruder which opening is connected to a conduit. The conduit leads through a regulator device to a gas source. Connected to the conduit, between the regulator device and the orifice, is a pressure sensor such as a pressure difference switch. If the level of molten material in the dome rises above a preselected level, it blocks the opening and produces a back-pressure in the conduit. The switch is automatically actuated by this back-pressure and produces a signal. Appropriate action can then be taken to prevent the further rise of the molten material in the dome and to prevent blockage of the degassing device.

6 Claims, 2 Drawing Figures

4,484,878

FILLING LEVEL MONITORING DEVICE

FIELD OF THE INVENTION

The present invention relates to a filling level monitoring device. More particularly, the present invention relates to a device which is used for monitoring the level of molten plastics or rubber materials in the degassing space of an extrusion press.

DESCRIPTION OF PRIOR ART

In U.S. Pat. No. 4,197,268 there is disclosed a device for monitoring the filling level in the degassing space of a single or double screw extruder used for processing plastics materials. In such an arrangement, an excess filling level is detected by means of a monitoring device located in the dome or jacket of the degassing device. This activates a control device which shuts off the supply of material to the extruder. At the same time, the suction utilised to effect the degassing is interrupted by the control device and a positive gas pressure is applied through the degassing conduit into the dome or jacket to prevent the level of the molten plastics material from rising therein.

In such an arrangement, the monitoring device comprises a gamma ray source, that is to say, a radioactive source, which is located in a lead block. The intensity of the radiation is measured by means of a detector device located in the degassing dome. If the intensity of the gamma ray beam changes due to the level of the molten material in the degassing dome rising, a pulse is produced which is transmitted to the control device.

Such monitoring devices which utilise radioactive material require the adoption of special safety measures and are, therefore, not universally applicable. Moreover, devices of this type are expensive. A device of this type is, however, useful in large extruder units which are extensively automated. However, a new solution to the monitoring problem is necessary if smaller, cheaper extruder units are to have effective monitoring of the filling level in the degassing dome.

It is also necessary, in monitoring device of this general type to ensure that a signal is obtained promptly from the monitoring device. This is so that corrective measures may be applied, thus preventing the occurrence of excessive amounts of molten material in the degassing dome.

OBJECT OF THE PRESENT INVENTION

The present invention seeks to provide a monitoring device which is of a simpler construction, is more economic to produce and utilise and which is at least as reliable as such known devices.

BRIEF SUMMARY OF THE INVENTION

According to the present invention, there is provided a device for monitoring the level of thermoplastics or rubber material in a degassing dome or jacket of a single or double worm extruder, the degassing dome or jacket being connected to a vacuum source, the device comprising a level detection opening located in the degassing dome or jacket, a branched conduit connected to the level detection opening, one branch of the conduit being connected to a gas source through a regulator device, the regulator device being disposed opposite the level detection opening, and the other branch being connected to a pressure detector, the junction of the two branches being located between the level detection opening and the regulator device.

In use, the degassing dome or jacket has a suction line in communication therewith. Accordingly, the interior of the dome or jacket is at a pressure below atmospheric pressure. A gas at a slightly higher pressure than that subsisting in the degassing dome or jacket is introduced into the dome through an opening in the dome. The opening may be in the form of an open-ended conduit to which a further conduit is connected, which open end of the conduit extends into the lower region of the dome or jacket.

When the lower open end of the conduit is closed by a rise in level of the molten plastics material in the dome, a back-pressure builds up in the gas supply conduit. The increase in pressure is transmitted to a pressure difference switch which is also connected to the pressure line and when the pressure reaches a pre-determined unacceptable level, the switch closes and produces a signal, preferably an acoustic signal, which alerts the operator to the fact that the level of the molten material in the degassing dome has risen to an unacceptably high level. The operator can then take steps to increase the rotation speed of the screw and/or can reduce the supply of material to the extruder.

An essential requirement for the operation of the monitoring device of the present invention is that an increase or a change in pressure takes place in the pressure line connected to the opening when the latter is obstructed and that such change in pressure activates a pressure switch.

The pressure difference switch can, if desired, also be connected to the degassing dome by means of a second pressure line. In effect, this means that the pressure in the dome is being used as a comparison pressure. In this context, the pressure in the conduit in front of the regulator device must always be higher than the pressure in the dome in order to maintain or to ensure an increase of pressure in the pressure conduit when the opening is obstructed so that a very small amount of the gas (comparable with the smallest leakage) is continually released from the opening into the dome or jacket.

BRIEF DESCRIPTION OF THE DRAWING

The invention will be further described, by way of example, with reference to the accompanying drawing, in which.

DESCRIPTION OF PREFERRED EMBODIMENTS

Figure 1:
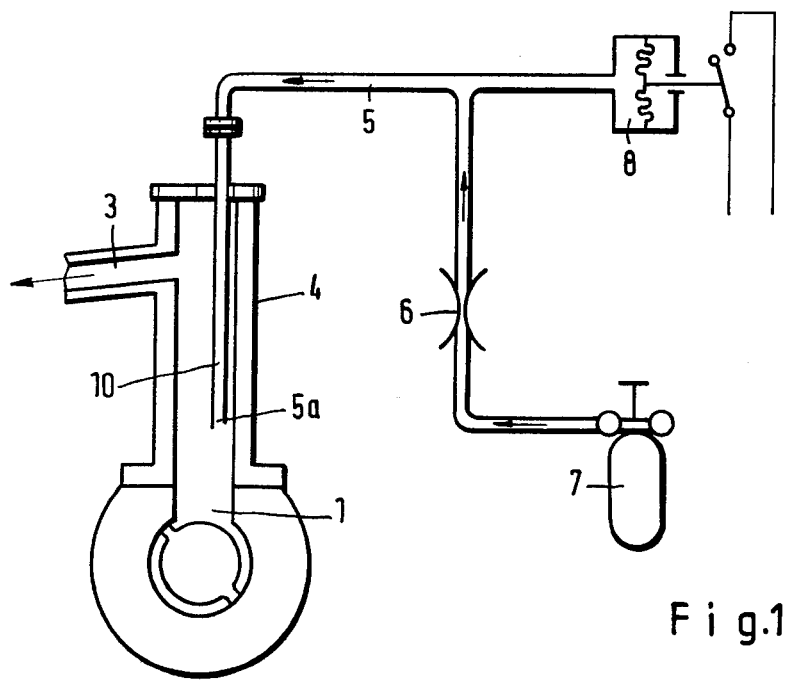
FIG. 1 shows, schematically, a circuit diagram of a filling level monitoring device in accordance with the present invention.

In the drawing, there is shown an extruder 2 which includes a degassing space 1. A line or conduit is provided for the extraction of volatile monomers or similar gaseous components from the degassing space 1. A reduced pressure of, for example, 0.2 bar is applied to the gas extraction line 3. The degassing space 1 is located in a degassing dome or jacket 4. Since temperatures of some 200° to 300° C. prevail in the degassing dome 4 and since the contents thereof are readily combustible, the materials used for making the device must be explosion-proof.

The degassing dome or jacket 4 is provided with an air-tight seal at its upper end in the form of a cover 4a. Passing through the cover 4a is a conduit 10 which is detachably connected by, for example, a screw connection to a conduit 5 which is branched intermediate its ends. One end 5a of the conduit 10 is open and is located adjacent the bottom of the dome or jacket 4.

One branch of line 5 leads, through a regulator 6 to a source 7 of an inert gas such as nitrogen. The source 7 supplies the nitrogen at a pressure of, for example 1.2 bar absolute to the regulator 6. The regulator 6 reduces the pressure to 0.21 bar absolute that is to say, slightly above the pressure subsisting in the dome 4 so that small amounts of nitrogen are continually dosed, via the conduit 5, into the degassing dome 4. The other branch of conduit 5 is connected to a pressure switch 8.

It will be appreciated that, in use, molten plastics material is often present in the dome 4. If, for any reason, the level of such material rises to the level of the opening 5a at the bottom end of conduit 10 (which is effectively a continuation of conduit 5), the opening 5a will become blocked. This will prevent the nitrogen, which is at a pressure of 0.21 bar, flowing out of conduit 5 or 10 into the degassing dome 4.

As a result of this, a back-pressure will build up in conduit 5 and will be transmitted back to the pressure switch 8. When such back-pressure reaches an undesired level of, for example, 0.6 bar, the pressure switch responds and closes an electrical contact thereby producing an audible or visible signal. Such signal will alert the operating personnel to the undesired rise in the level of the melt in degassing dome 4.

The signal produced can, if desired, also be used to reduce the amount of material being fed to the extruder whilst simultaneously increasing the rotation speed of the feed of the extruder. This will cause the level of the melt in the dome 4 to fall.

As the sensitive components of the device of the present invention are located outside the degassing dome 4, and thus away from the highly explosive atmosphere in such dome 4, a highly reliable and explosion-proof method of monitoring the operation of the degassing dome 4 is provided. As only the conduit 10 is located in the interior of the dome 4, the level detection point 5a can be located as close to the degassing space as desired so that the limit level of melt detected in the degassing space can be easily adjusted. Any molten plastics material which enters the line during such malfunction is automatically blown out after the malfunction has been detected. If necessary, conduits 5 and 10 can be unscrewed from one another and can be easily cleaned. Alternatively, they can be briefly pressurised by passing gas at a higher pressure from the reservoir 7 through the regulator 6 into the lines 5 and 10. This blows back any molten plastics material which may have entered the opening 5a.

Figure 2:
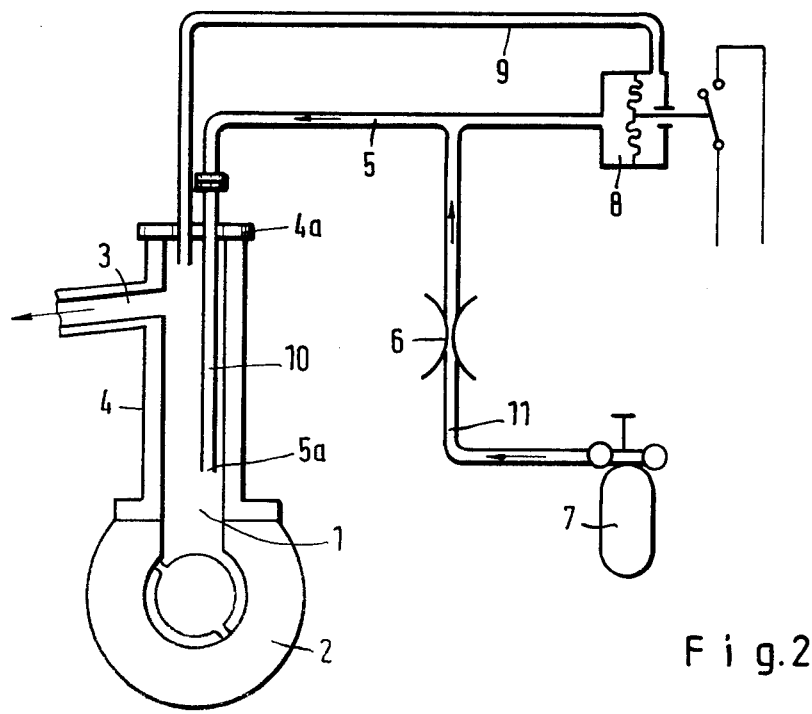
FIG. 2 shows a circuit diagram almost identical to that shown in FIG. 1 but additionally including a pressure difference switch.

FIG. 2 shows a similar circuit but in which a conduit 9 is provided which connects pressure switch 8 to the degassing dome 4. Pressure switch 8 in such an arrangement then reacts solely to changes in the pressure difference between conduits 5 and 10 and the degassing dome 4 independently of the magnitude of the reduced pressure. The signal is thereby provided sooner and more reliably than by the arrangement shown in FIG. 1.

We claim:

1. In an extruding device for processing thermoplastic materials or rubber in which a degassing zone is provided for discharging gas from the material being treated, the improvements comprising:
   (a) a degassing dome from which gas is removed from the material, and means communicating with said dome for reducing the pressure in said dome thereby to induce the discharge of said gas,
   (b) means defining a level detection orifice in said dome,
   (c) conduit means in flow communication with said orifice,
   (d) regulator means in flow communication with said conduit means,
   (e) means for supplying gas to said conduit means through said regulator means, said regulator means controlling the pressure of the gas, and
   (f) pressure detector means in flow communication with said conduit means for detecting the pressure therein,
   whereby an increase in pressure in said conduit means due to blockage of said orifice actuates said pressure detector means to signal undesirable material buildup in said dome.

2. A device as recited in claim 1, wherein said degassing dome includes a base adjacent to said extruding device, and wherein said level detection orifice is located in said base.

3. A device as recited in claim 1, wherein said conduit means comprises first and second interconnected conduits, said first conduit being open at its lower end and defining said level detection orifice, and said second conduit having said regulator means located therein and being connected to said gas supply means.

4. A device as recited in claim 1 wherein said pressure detector means comprises a pressure difference switch, said device further comprising additional conduit means connecting said switch to said degassing dome.

5. A device as recited in claim 1, wherein the pressure in said conduit means between said gas supply means and said regulator means is maintained at a higher level than the pressure in said degassing dome.

6. A device as recited in claim 1 wherein the pressure in said conduit means between said regulator means and said orifice is maintained at a slightly higher level than the pressure in said degassing zone so that small amounts of gas can be continually dosed into said dome when said orifice is not blocked.

* * * * *